(12) United States Patent
Dodge et al.

(10) Patent No.: US 7,599,972 B2
(45) Date of Patent: Oct. 6, 2009

(54) FILE SYSTEM HAVING VARIABLE LOGICAL STORAGE BLOCK SIZE

(75) Inventors: Dan Dodge, Nepean (CA); Peter Van Der Veen, Ottawa (CA)

(73) Assignee: QNX Software Systems GmbH & Co. KG, Karlsbad (DE)

( * ) Notice: Subject to any disclaimer, the term of this patent is extended or adjusted under 35 U.S.C. 154(b) by 313 days.

(21) Appl. No.: 11/510,174

(22) Filed: Aug. 25, 2006

(65) Prior Publication Data

US 2008/0052329 A1 Feb. 28, 2008

(51) Int. Cl.
*G06F 17/30* (2006.01)
*G06F 12/00* (2006.01)

(52) U.S. Cl. .................. 707/205; 707/203; 711/114; 711/162; 711/170

(58) Field of Classification Search .................. None
See application file for complete search history.

(56) References Cited

U.S. PATENT DOCUMENTS

| | | | |
|---|---|---|---|
| 4,926,317 A | 5/1990 | Wallach et al. | |
| 4,945,475 A | 7/1990 | Bruffey et al. | |
| 5,187,786 A | 2/1993 | Densmore et al. | |
| 5,455,944 A | 10/1995 | Haderle et al. | |
| 5,530,849 A | 6/1996 | Hanushevsky et al. | |
| 5,726,989 A * | 3/1998 | Dokic | 370/509 |
| 5,774,715 A * | 6/1998 | Madany et al. | 707/101 |
| 5,897,661 A * | 4/1999 | Baranovsky et al. | 711/170 |
| 6,058,400 A | 5/2000 | Slaughter | |
| 6,292,808 B1 | 9/2001 | Obermarck et al. | |
| 6,467,021 B1 * | 10/2002 | Sinclair | 711/113 |
| 6,571,259 B1 | 5/2003 | Zheng et al. | |
| 6,591,376 B1 | 7/2003 | VanRooven et al. | |

(Continued)

FOREIGN PATENT DOCUMENTS

| | | |
|---|---|---|
| JP | 62-186361 A | 8/1987 |
| JP | 06-139124 A | 5/1994 |

OTHER PUBLICATIONS

Cárdenas, Alfonso F. "Analysis and Performance of Inverted Data Base Structures." IBM Research Laboratory, San Jose, Communication of ACM May 1975, vol. 18, No. 5, pp. 253-263.

(Continued)

*Primary Examiner*—Greta L Robinson
*Assistant Examiner*—James J Wilcox
(74) *Attorney, Agent, or Firm*—Brinks Hofer Gilson & Lione

(57) ABSTRACT

A system is set forth that includes a processor, a data storage device that accessible by the processor, and filesystem software that executable by the processor to organize files on the data storage device. The filesystem software is executable to organize files on the data storage device in storage areas having different logical storage block sizes that are dependent on file type. In one implementation, the filesystem software is executable to generate a hole map associated with the data storage device. The hole map comprises data indicative of a logical storage block size for each of a plurality of storage areas of the data storage device and, optionally, data indicative of a degree of usage for each of the plurality of storage areas. The filesystem may identify the file type using a filename of the file and/or embedded file information.

19 Claims, 7 Drawing Sheets

U.S. PATENT DOCUMENTS

| | | |
|---|---|---|
| 6,606,628 B1 | 8/2003 | Monsen et al. |
| 6,748,491 B2 | 6/2004 | Rodriguez |
| 6,754,696 B1 | 6/2004 | Kamath et al. |
| 6,845,401 B1 | 1/2005 | Lafuite et al. |
| 6,856,993 B1 | 2/2005 | Verma et al. |
| 7,047,257 B2 | 5/2006 | Fletcher et al. |
| 7,139,752 B2 | 11/2006 | Broder et al. |
| 7,181,463 B2 | 2/2007 | Moore et al. |
| 7,191,185 B2 | 3/2007 | Dweck et al. |
| 2002/0174295 A1 | 11/2002 | Ulrich et al. |
| 2005/0149525 A1 | 7/2005 | Verma et al. |
| 2007/0005560 A1 | 1/2007 | Dodge |
| 2007/0005614 A1 | 1/2007 | Dodge |
| 2007/0005615 A1 | 1/2007 | Dodge |
| 2007/0005627 A1 | 1/2007 | Dodge |
| 2007/0005874 A1 | 1/2007 | Dodge |
| 2007/0005894 A1 | 1/2007 | Dodge |
| 2007/0113120 A1 | 5/2007 | Dodge |

OTHER PUBLICATIONS

Colyer, A. M. "Displaying and Manipulating Relationships." IBM Technical Disclosure Bulletin, Dec. 1995, vol. 38, Issue No. 12, pp. 391-396.

QNX Software Systems, "Embedded transaction filesystem (ETFS)," *System Architecture*, 2004, pp. 193-198.

* cited by examiner

| Bit Settings | Area Type |
|---|---|
| 00 | Cluster |
| 01 | Bundle |
| 10 | Wad |
| 11 | Throng |

Figure 3

| Area Type | Block size |
|---|---|
| Cluster | 4K |
| Bundle | 64K |
| Wad | 256K |
| Throng | 1024K |

Figure 4

| Bit Settings | Area Usage |
|---|---|
| 00 | Empty |
| 01 | Undefined |
| 10 | Partial |
| 11 | Full |

Figure 5

| Name | File type | Area type |
|---|---|---|
| *.mp3 | MPEG layer III auido | Bundle |
| *.wma | Windows media audio | Bundle |
| *.wmv | Windows media video | Wad |
| *.mov | QuickTime video | Wad |
| *.mpg | MPEG movie | Wad |
| ! | Pattern matching OS executable program | Cluster |
| * | Pattern matching anything not specified | Cluster |

Figure 6

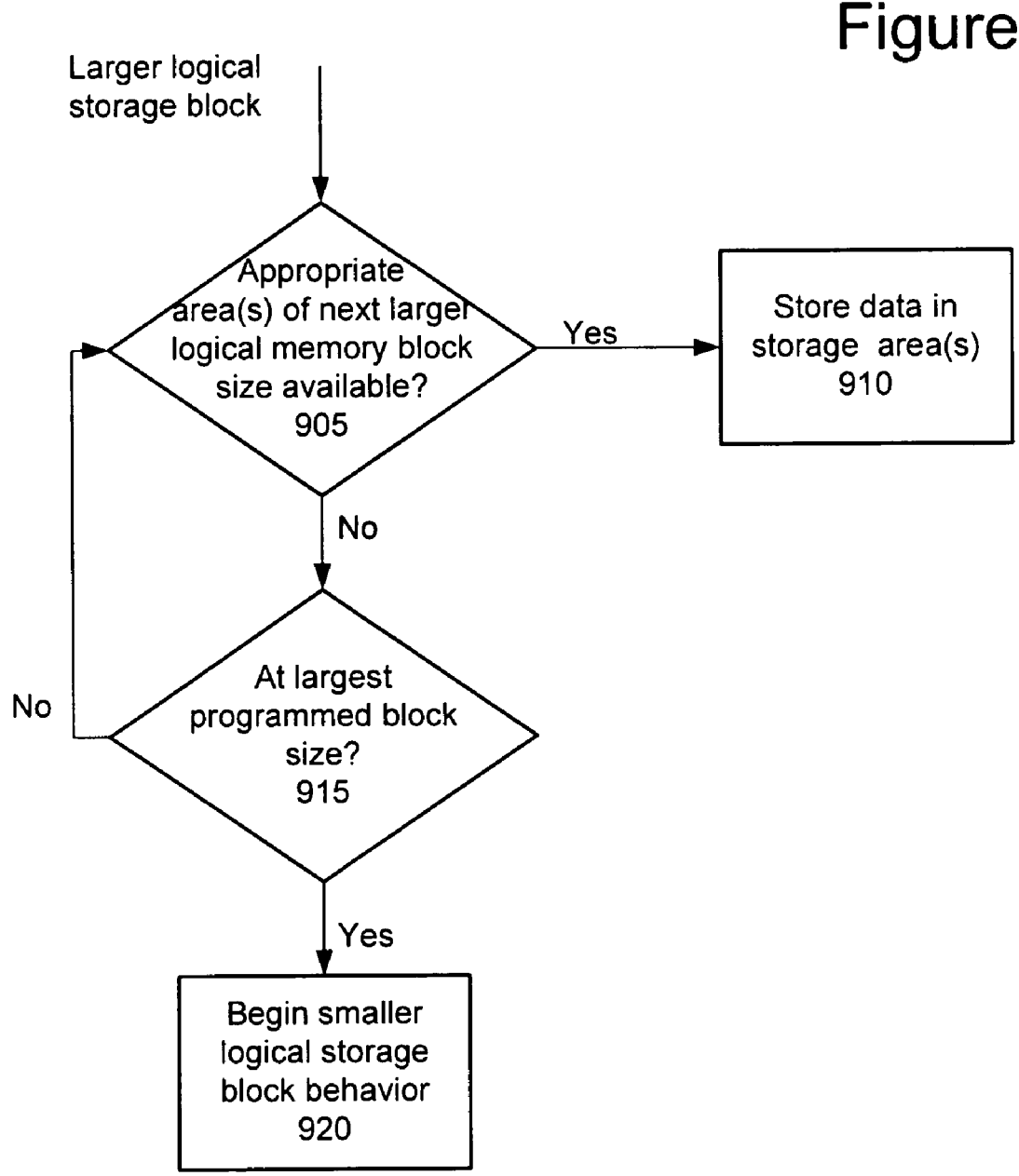

FILE SYSTEM HAVING VARIABLE LOGICAL STORAGE BLOCK SIZE

BACKGROUND OF THE INVENTION

1. Technical Field

This invention is generally directed to a filesystem for use in a computer, embedded controller, processing system, or the like. More particularly, this invention is directed to a filesystem that organizes data storage space into logical storage blocks of different sizes.

2. Related Art

Computers, embedded controllers, and other microprocessor based systems are typically constructed from a variety of different hardware components. The hardware components may include a processor, I/O devices, human interface devices, and the like. Additionally, such systems use memory storage units to maintain the data used in the system. The memory storage units may take on a variety of different forms including, but not limited to, hard disk drives, floppy disk drives, random access memory, flash memory, and the like.

High-level application programs that are executed in such systems must often interact seamlessly with these hardware components, including the memory storage units. To this end, many systems run an operating system that acts as an interface between the application programs and the system hardware. Filesystem software may be included as part of the operating system or it may be provided as an ancillary software component that interacts with the operating system. In either instance, the filesystem software organizes the data within the memory storage units for ready access by the processor and the high-level application programs that the processor executes.

The filesystem software may employ a file/directory layer that organizes the contents of files and directories into equal-sized logical storage blocks of contiguous data on the storage device. Each logical storage block has an association with one or more corresponding physical blocks on the storage device where the data is actually retained. The file/directory layer may execute updates to the filesystem by identifying every logical storage block that needs to be updated in response to a request and rewriting the entire contents of each such logical storage block. The file/directory layer may read the contents of files and directories by reading the entire contents of every logical storage block that holds a portion of the region of data to be read.

The filesystem also may include a storage layer that maps the virtual addresses of filesystem contents to physical blocks of data on the data storage device. The storage layer may execute logical block read requests from the file/directory layer by determining the correct physical block(s) associated with the request and reading its contents from the data storage device. Similarly, the storage layer may execute write requests by either updating contents of an existing physical block(s), or by allocating an unused physical block from the data storage device to the logical storage block and then updating the contents of the physical block.

Existing filesystems are not optimized for the various types of file data that are encountered since all logical storage blocks have the same size and all physical blocks have the same size. In these existing filesystems, a fixed logical storage block size is employed for all data types and represents a compromise between file types associated with long access streams and file types associated with short access streams. Accordingly, an alternative to existing filesystem organizations is needed.

SUMMARY

A system is set forth that includes a processor, a data storage device that accessible by the processor, and filesystem software that executable by the processor to organize files on the data storage device. The filesystem software is executable to organize files on the data storage device in storage areas having different logical storage block sizes that are dependent on file type. In one implementation, the filesystem software is executable to generate a hole map associated with the data storage device. The hole map comprises data indicative of a logical storage block size for each of a plurality of storage areas of the data storage device and, optionally, data indicative of a degree of usage for each of the plurality of storage areas. The filesystem may identify the file type using a filename of the file and/or embedded file information.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 3 is a table showing exemplary bit settings that may be used in the holes of the hole map of FIG. 2 to identify the corresponding area type.

FIG. 4 is a table showing an exemplary correlation between the area types referenced in FIG. 3 and logical storage block size.

FIG. 5 is a table showing exemplary bit settings that may be used in the holes of the hole map of FIG. 2 to indicate a degree of usage of the corresponding storage area.

FIG. 6 is a table showing exemplary file types and corresponding area types that may be used by the filesystem of FIG. 1.

FIG. 9 is a flow chart showing a number of interrelated operations that may be used to implement the larger logical storage block behavior shown at block 825 of FIG. 8.

DETAILED DESCRIPTION OF THE PREFERRED EMBODIMENTS

Figure 1:
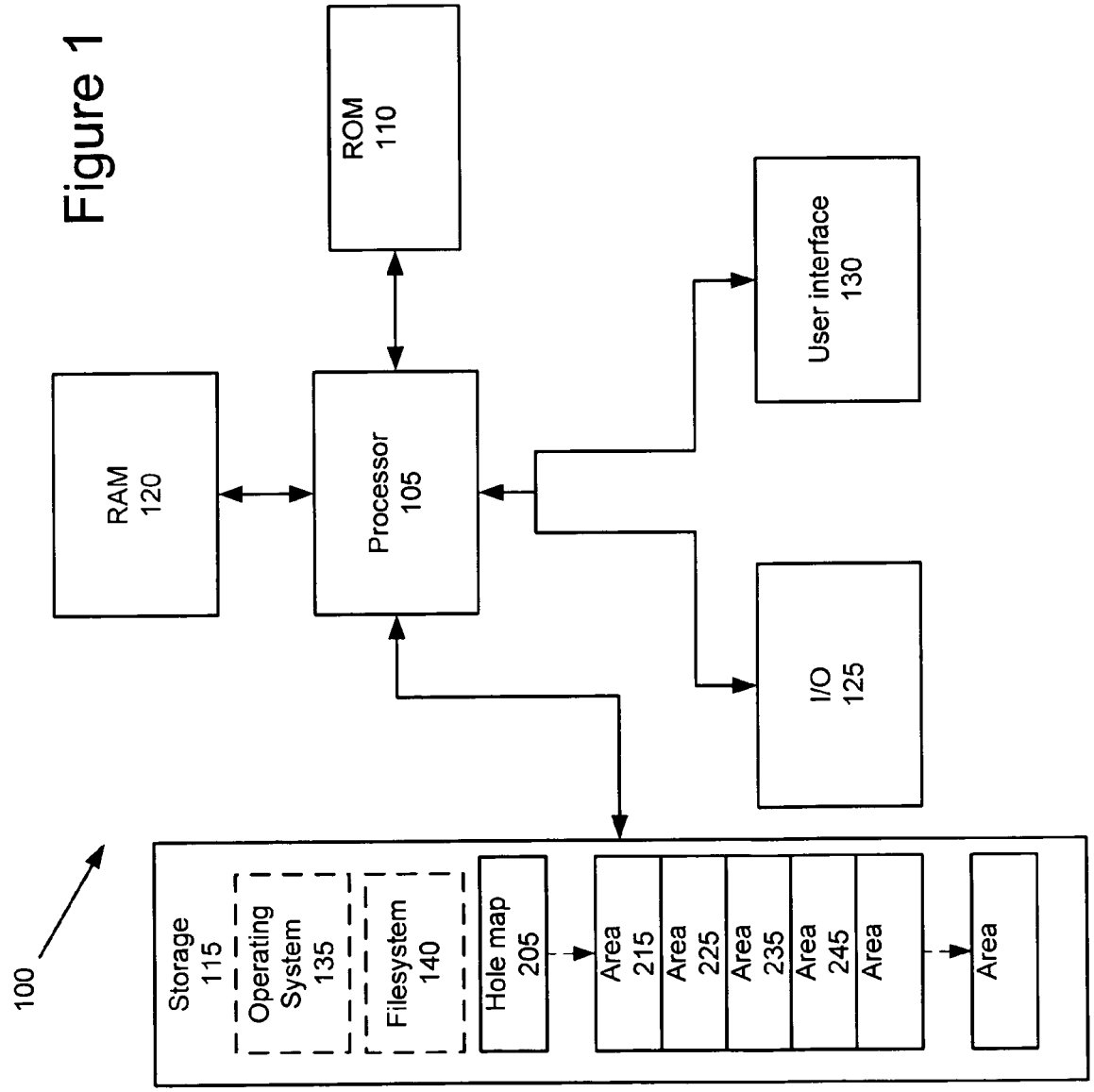
FIG. 1 is a block diagram of a processing system that may implement a filesystem having variable logical storage block storage size.

FIG. 1 illustrates the components that may be employed in an exemplary processing system 100. As shown, the exemplary system 100 includes a processor 105, read only memory 110, and data storage 115. Processing system 100 also may include random access memory 120, an I/O interface 125, and a user interface 130. The specific components that are used in processing system 100 may be tailored to the particular function(s) that are to be executed by the processing system 100. Accordingly, the presence or absence of a component may be specific to the design criterion imposed on the processing system 100.

Data storage 115 may include operating system code 135 that controls the interaction between high-level application programs executed by the processor 105 and the various hardware components, including memory 110 and 120, the data storage 115, and the interface devices 125 and 130. The operating system code 135 may include filesystem software for organizing files stored on the data storage 115. Alternatively, the filesystem software may be provided as a separate software component that merely interacts with the operating system code 135. In the latter case, the code corresponding to the filesystem software may be stored in read only memory 110, data storage 115 or the like. When processing system 100 is networked with other computers and/or storage devices through I/O interface 125, the filesystem software may be stored remotely and downloaded to processing system 100 as needed. FIG. 1, however, illustrates storage of the filesystem software 140 in data storage 115.

The data storage 115 may take on any number of different forms. For example, the data storage 115 may take the form of a hard disc drive, floppy disk drive, etc. It also may be in the form of a non-rotating media device, such as non-volatile memory implemented in an integrated circuit format (e.g., flash memory, and the like). Still further, data storage 115 need not be limited to a single memory structure. Rather, the data storage 115 may include a number of separate storage devices of the same type (e.g., all flash memory) and/or separate storage devices of different types (e.g., one or more flash memory units and one or more hard disk drives).

The files stored in the data storage 115 include data that is interpreted in accordance with a predetermined format used by an application program or by the operating system code 135. For example, the data stored within a file may constitute the software code of an executable program, the ASCII text of a database record, audio media files, video media files, or the like. The filesystem software 140 is executable by the processor 105 to allocate physical data storage on data storage 115 based on the type of data that is stored. File data is organized on data storage 115 by the filesystem software 140 in a manner that facilitates optimization of the speed of reading and writing the data without sacrificing the ability to efficiently store small files.

Figure 2:
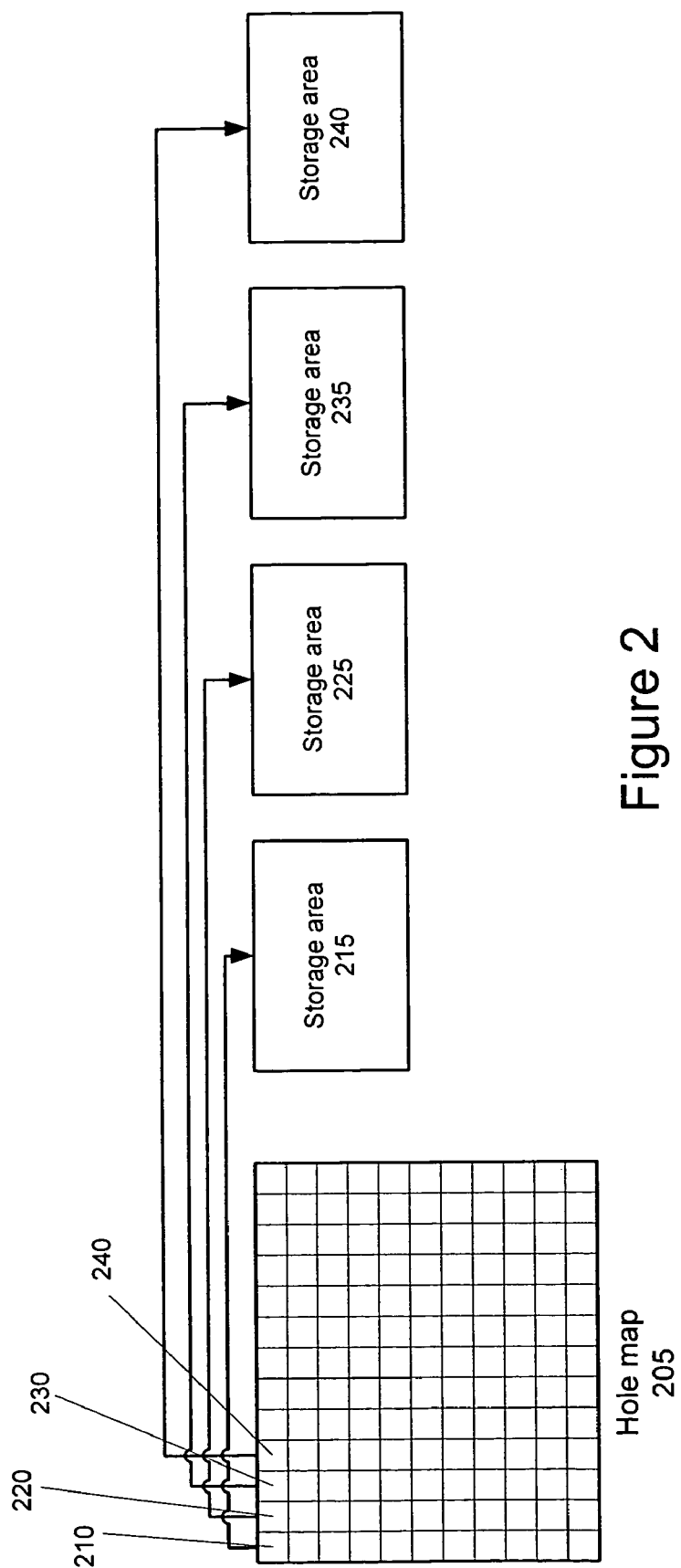
FIG. 2 is a block diagram of a hole map and corresponding storage areas showing one manner in which the filesystem may organize the file data on the data storage device of FIG. 1.

FIG. 2 illustrates one manner in which the filesystem software 140 may be used to organize the files on data storage 115. For ease of illustration, data storage 115 will be described as a hard disk system. However, the operation of the filesystem software 140 is readily extended to other types of data storage.

When the filesystem software 140 is initially executed, it allocates at least one hole map 205 for use as a bitmap representation of the storage areas of data storage 115. Hole map 205 may be created at the beginning of the disk drive volume of data storage 115 and initialized with zeros (0). Each hole in the hole map 205 may be comprised of four bits that correspond to a single storage area. As shown in FIG. 2, hole 210 corresponds to storage area 215. Hole 220 correspond to storage area 225. Hole 230 corresponds to storage area 235, and hole 240 corresponds to storage area 245. Other holes of hole map 205 correspond to additional storage areas of data storage 115.

Storage areas 215, 225, 235, and 245 may have the same physical size on data storage 115. For example, each storage area of data storage 115 may encompass a total storage area of 128 megabytes. However, the filesystem software 140 organizes files in the storage areas using logical storage block sizes that are dependent on the type of data in each of the storage areas. As shown in FIG. 3, two bits of each hole indicate the area type of the corresponding storage area. In this example, a bit setting of (00) identifies the corresponding storage area as a cluster area type. A bit setting of (01) identifies the corresponding storage area as a bundle area type. A bit setting of (10) identifies the corresponding storage area as a wad area type. A bit setting of (11) identifies the corresponding storage area as a throng area type.

FIG. 4 is a table showing exemplary logical storage block sizes for each of the storage area types. To this end, the filesystem software 140 organizes storage areas that are identified as cluster area types into logical memory blocks of 4K each. Storage areas that are identified as bundle area types are organized by the filesystem software 140 using logical memory blocks of 64K each. Storage areas that are identified as wad area types are organized by the filesystem software 140 using logical memory blocks of 256K each. Storage areas that are identified as throng area types are organized by the filesystem software 140 using logical memory blocks of 1024K each.

The logical storage block size assigned to a storage area corresponds to the size of the in-memory cache used by the filesystem for file data stored in the storage area. For example, data stored in a storage area that is designated with a cluster area type will be cached by the filesystem software 140 in memory using one or more 4K memory buffers. Data stored in a storage area that is designated with a bundle area type will be cached by the filesystem software 140 in memory using one or more 64K memory buffers. This same data caching operation extends to storage areas designated with a wad area type (256K cache memory buffers) as well as to storage areas designated with a throng area type (1024K cache memory buffers).

Each hole of hole map 205 also may include information indicative of the amount of space used by file data in the corresponding storage area. To this end, the remaining two bits of each hole may be used to encode usage information. FIG. 5 is a table showing one manner of encoding storage area usage. In this example, a bit setting of (00) is used to indicate that the corresponding storage area is empty. A bit setting of (10) is used to indicate that the corresponding storage area is partially filled with file data. A bit setting of (11) is used to indicate that the corresponding storage area is completely filled with file data thereby inhibiting the filesystem software 140 from storing further data in the corresponding storage area. Other bit settings indicating that a particular storage area is above or below a particular value may also be employed.

Whether a particular storage area is designated as a cluster, bundle, wad, or throng is dependent on the file type of the data stored in the storage area. Variable logical storage block sizes allow optimization of each storage area for reading and writing different types of files since applications tend to access different file types in different manners. For example, data associated with a video media file may be accessed in large sections at a time. As such, it may be more efficient for the filesystem software 140 to use a large logical storage block size, such as a wad or throng, to organize such video media data for subsequent access by, for example, a video player application. Likewise, data associated with an audio media file may be accessed in large sections at a time, although such audio media sections may be smaller than the corresponding video media data sections. Accordingly, it may be efficient for the filesystem software 140 to use a medium-sized logical storage block structure, such as a bundle or wad, to organize audio media data. Data associated with other file types may be efficiently handled by the filesystem software 140 using cluster-sized logical storage blocks. Additionally, cluster-sized logical storage blocks may be used to organize indeterminate file types.

Examples of various file types and the area type that may be assigned by the filesystem software 140 to a storage area containing data for the file type are shown in the table of FIG. 6. Such a table may be incorporated in the filesystem software 140 to designate each area type that is to be associated with a given file type. The association may be user selectable based, for example, on initialization parameters provided to system 100. In this manner, system 100 may be optimized by the user for handling the types of files that are most likely to be encountered by the filesystem software 140. The filesystem software may use these mappings in the order shown, with the area type associated with the first file type match being used. These relationships may also be overridden by a user/developer.

Figure 7:
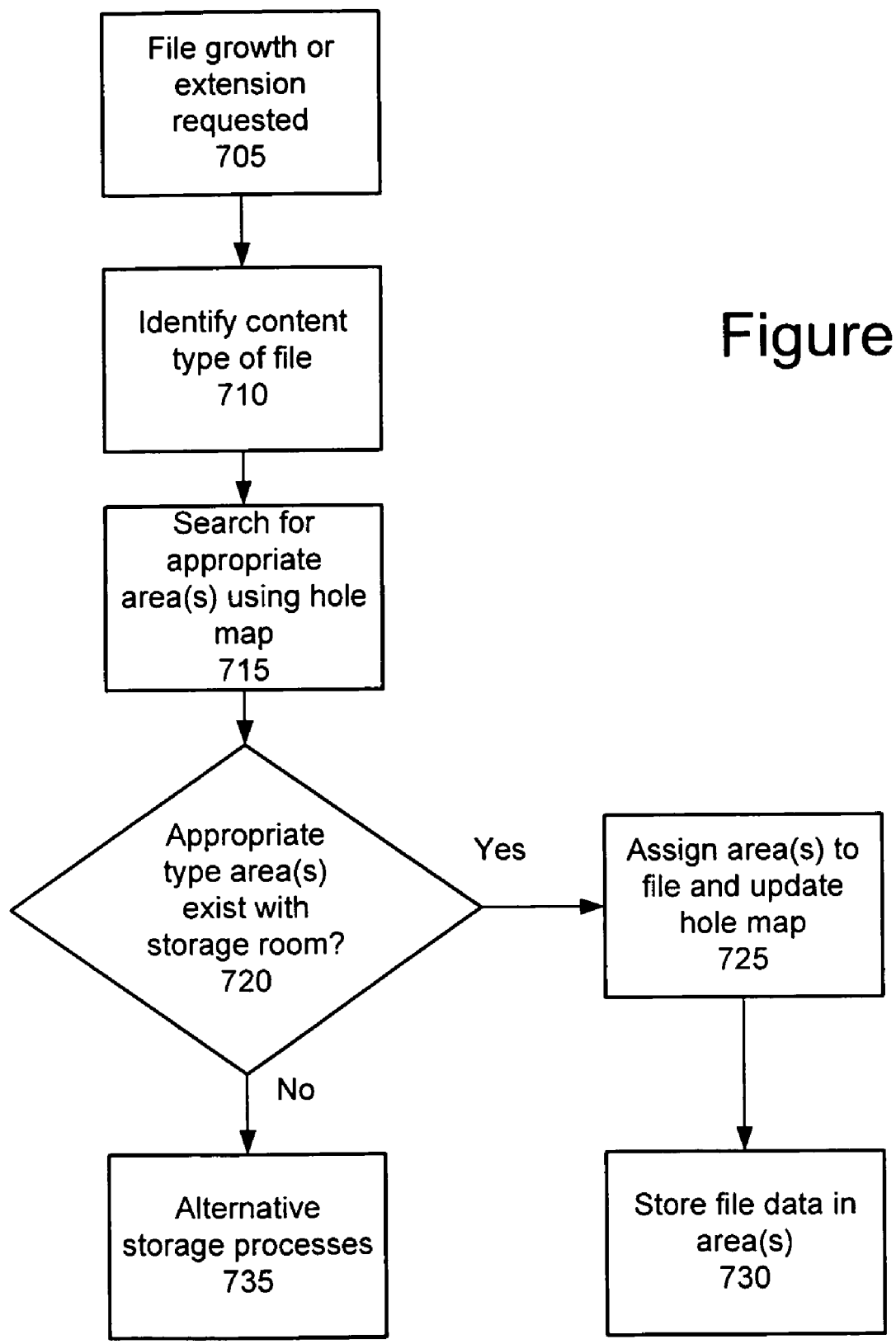
FIG. 7 is a flow chart showing a number of interrelated operations that may be used when growing or extending a file in the filesystem.

FIG. 7 is a flow chart showing a number of interrelated operations that may be executed during file growth or extension. As shown, file growth or extension is requested at block 705. The filesystem software 140 attempts to identify the content type of the file at block 710. Identification of the content type may be pursued in a number of different manners. For example, the filesystem software 140 may compare the file extension to the various file extensions shown in FIG. 6 to determine the file type. Alternatively, or in addition, the filesystem software 140 may look to content embedded in the file to identify the file type. Once the file type is known, a search is made at block 715 to determine whether there are any storage areas of the appropriate area type in which to store the file data. If appropriate type area(s) with storage room exist at block 720, the filesystem software 140 assigns the area(s) to the file at block 725 and, if necessary, updates the hole map for the corresponding storage areas. Whether a storage area has space for storing the file data may be determined by examining the area usage bits corresponding to the storage area in the hole map 205. If the area usage bit settings indicate that the area is empty, the filesystem software 140 may use the storage area for storing the file data. If the bit settings indicate that the area is partially full, the filesystem software 140 may determine the exact amount of free space in the storage area by, for example, counting the used bits in the space. A portion or all of the free space in a storage area may be used to store a portion or all of the data of a file. Once the amount of free space is known, it may be stored in a table in, for example, RAM 120 for subsequent use. Further changes to the amount of free space for a storage area may be reflected in updates to this table. Once the filesystem 140 identifies storage area(s) of the appropriate area type and having free space, the file data is stored in the storage area(s) in the operation shown at block 730. If the operation executed at block 720 fails to find a storage area(s) of an appropriate area type with free storage space for the file data, one or more alternative storage processes may be executed at block 735.

Figure 8:
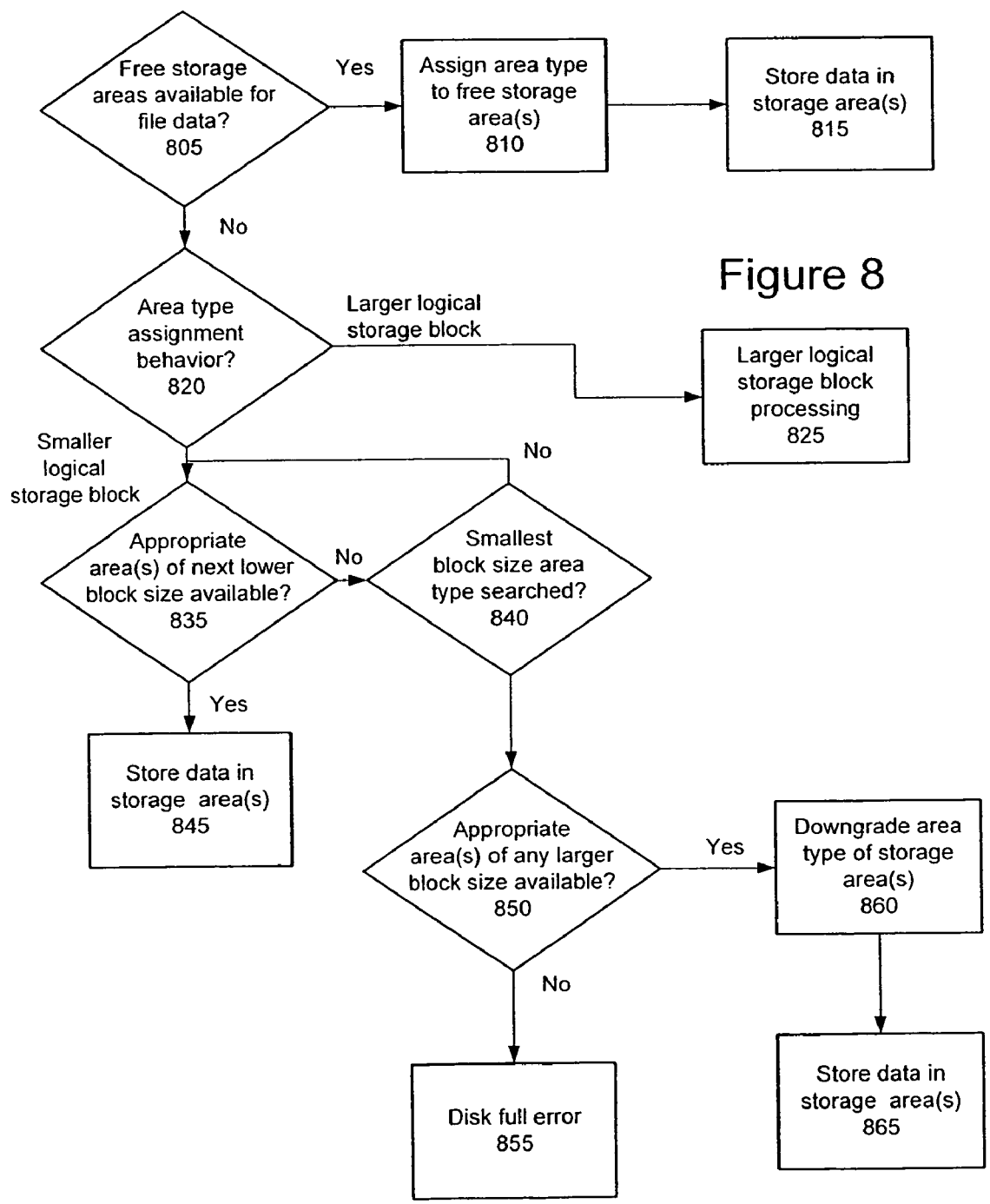
FIG. 8 is a flow chart showing a number of interrelated operations that may be used in the alternative storage processes operation of FIG. 7.

FIG. 8 is a flow chart showing a number of interrelated operations that may be executed as part of the alternative storage processes shown at block 735 of FIG. 7. At block 805, the filesystem software 140 checks the hole map 205 to determine whether there are any empty storage areas that do not have an area type assignment. If such free storage areas exist, the filesystem software 140 assigns an area type corresponding to the file type to the free storage area(s) at block 810 by, for example, updating the hole map 205 for the corresponding storage area(s). The data for the file is stored in the storage area(s) in the operation shown at block 815.

If there are no free storage areas at block 805, then all storage areas of the data storage 115 have been assigned an area type and may contain data. The filesystem software 140 may handled this situation in a number of different manners. In the exemplary operations shown in FIG. 8, the filesystem software 140 checks to determine whether there is an area type assignment behavior assigned to the system, file type, and/or particular file at block 820. As such, the area type assignment behavior may be implemented at the system level, by file type, and/or at the individual file level. This behavior may be user selectable during development of system 100 and/or during system initialization.

Two area type assignment behaviors are illustrated in FIG. 8. They are labeled as "larger logical storage block" behavior and "smaller logical storage block" behavior. If the operation at block 820 indicates that "larger logical storage block" behavior is to be exhibited, the filesystem software 140 proceeds to execute the corresponding larger logical storage block processing at block 825. If the operation at block 820 indicates that "smaller logical storage block" behavior is to be exhibited, the filesystem software 140 searches the hole map 205 at block 835 for storage area(s) having an area type with the next smaller logical storage block size and some free space to store the file data. For example, if the file data that is to be stored is originally associated with a wad area type, the filesystem software 140 will search the hole map 205 for one or more storage area(s) having a bundle area type with some space available in which to store the file data. If one or more storage areas of the next smaller logical storage block size are available for storing the file data, the filesystem software 140 stores the file data in the storage area(s) at block 855 and may update the hole map 205 accordingly (i.e., partial, full, etc.). One or more of the foregoing operations are repeated until all data for the file that can be stored at this area type level is stored.

If the operation at block 835 fails to locate an appropriate area for saving the file data or there is data remaining for storage after some data has already been stored in the prior operations, a check is made at block 840 to determine whether the last area type searched at block 835 corresponds to the smallest logical storage block size area available in the filesystem. If it does not correspond to the smallest area type, the filesystem software 140 will continue searching for storage areas having an area type associated with the next smaller logical storage block size in which to store file data. Using the foregoing example, the filesystem software 140 will search the hole map 205 for one or more storage area(s) having a cluster area type with space available in which to store file data. If such an area(s) is found, the operation at block 845 will be executed. If the filesystem software 140 fails to locate an appropriate area for storing the file data using the "smaller logical storage block" behavior, a check may be made at block 850 to determine whether any storage areas having a larger logical storage block size have space for storing file data. In those instances in which larger logical storage block behavior has been implemented, only storage areas having logical storage block sizes that have not been searched need be considered during the operations of block 850. If the filesystem software 140 is unable to locate appropriate areas having larger logical memory block sizes in which to store the file data, a disk full error may be declared at block 855. Otherwise, the storage areas identified at block 850 may be downgraded at block 860 to a lower value area type, such as a cluster or an area type corresponding to the file type. The data is stored in the storage areas at block 865. Again, one or more of the foregoing operations are repeated until all data for the file that can be stored at a given area type level is stored.

FIG. 9 is a flow chart showing a number of interrelated operations that may be used to implement the larger logical storage block behavior shown at block 825 of FIG. 8. As shown, the filesystem software 140 searches the hole map 205 at block 905 for a storage area(s) having an area type with the next larger logical storage block size and free space to store the file data. For example, if the file data that is to be stored is originally associated with a bundle area type, the filesystem software 140 will search the hole map 205 for one or more storage area(s) having a wad area type with space available in which to store the file data. If one or more storage areas of the next larger logical storage block size are available for storing the file data, the filesystem software 140 stores file data in the storage area(s) at block 910.

If the operation at block 905 fails to locate an appropriate area for saving the file data, a check is made at block 915 to determine whether the last area type searched at block 905 corresponds to the largest logical storage block size area that is to be searched. The largest logical storage block size area that is to be searched may be user selectable through programming. If it does not correspond to the largest logical storage block size, the filesystem software 140 will continue searching for storage areas having an area type associated with the next larger logical storage block size at block 905. Using the foregoing example, the filesystem software 140 will search the hole map 205 for one or more storage area(s) having a throng area type with space available in which to store the file data. If such an area(s) is found, the operations at block 910 will be executed. If the filesystem software 140 fails to locate an appropriate area for storing the file data after all permitted larger logical memory block sizes have been searched, it may begin execution of smaller logical storage block behavior at block 920. Such smaller logical storage block behavior is illustrated in FIG. 8.

In the operations shown in FIGS. 7, 8, and 9, the selection of specific storage areas for the file data may proceed in a number of different manners. For example, the storage areas having the largest amount of free space may be selected for storing the file data. Alternatively, the storage areas having the least amount of free space may be selected for storing the file data. Still further, the filesystem software 140 may assign the first storage areas that it identifies that meet the area type and space criterion for storage of the file data.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
   a processor;
   a data storage device having memory accessible by the processor;
   filesystem code executable by the processor to manage files of different file types on the data storage device using different storage area types, where the different storage area types define different logical storage block sizes used by the filesystem to logically divide the memory of the data storage device, where the filesystem code identifies the file type of each file managed by the filesystem code and executes memory transactions for each managed file using the storage area type assigned to the file type.

2. The system of claim 1, where the different media file types comprise video data files, audio data files, and executable files.

3. The system of claim 2, where the filesystem code is executable to organize video data files in larger logical storage block sizes than audio data files.

4. The system of claim 3, where the filesystem code is executable to organize audio data files in larger logical storage block sizes than executable files.

5. The system of claim 1, where the filesystem code is executable to generate a hole map associated with the data storage device, and where the hole map comprises data indicative of a logical storage block size for each of a plurality of storage areas of the data storage device.

6. The system of claim 5, where the filesystem code is executable to generate the hole map proximate a beginning portion of a volume on the data storage device.

7. The system of claim 5, where the filesystem code is executable to store data indicative of a degree of usage of mapped storage areas of the storage device in the hole map.

8. The system of claim 1, where the filesystem code is executable to identify the file type of a file using a filename of the file.

9. The system of claim 1, where the filesystem code is executable to identify the file type of a file using embedded file information.

10. The system of claim 1, where the filesystem code is executable to store file data in an area of a lesser logical storage block size when an area of a logical storage block size corresponding to the file type is unavailable.

11. The system of claim 1, where the filesystem code is executable to store file data in a degraded area of the memory storage when an area of a logical storage block size corresponding to the file type is unavailable.

12. A system comprising:
    a processor;
    a data storage device having memory storage accessible by the processor;
    filesystem code executable by the processor to manage files on the data storage device, where the filesystem code is executable to manage files on the data storage device using storage areas of a first type having a first logical storage block size and storage areas of a second type having a second logical storage block size that differs in size from the first logical storage block size, where the first and second logical storage block sizes are used by the filesystem code to logically divide the memory of the storage device, and where the filesystem code is further executable to store file data of a file of a first file type in storage areas of the first type and file data of a file of a second file type in storage areas of the second type, and where the filesystem code is executable to identify whether each file managed by the file system code is of the first or second file type.

13. The system of claim 12, where the first file type comprises video data files and the second file type comprises audio data files.

14. The system of claim 13, where the first logical storage block size is larger than the second logical storage block size.

15. The system of claim 12, where the filesystem code is executable to generate a hole map corresponding to storage areas of the data storage device, where the hole map comprises data indicative of whether a storage area is of the first or second type.

16. The system of claim 15, where the hole map generated through execution of the filesystem code is stored proximate a beginning of a volume on the data storage device.

17. The system of claim 15, where the hole map comprises data indicative of a degree of usage of the storage areas of the storage device that are mapped in the hole map.

18. The system of claim 12, where the filesystem code is executable to identify the file type of a file using a filename of the file.

19. The system of claim 12, where the filesystem code is executable to identify the file type of a file using embedded file information.

* * * * *

UNITED STATES PATENT AND TRADEMARK OFFICE
CERTIFICATE OF CORRECTION

| | | |
|---|---|---|
| PATENT NO. | : 7,599,972 B2 | Page 1 of 1 |
| APPLICATION NO. | : 11/510174 | |
| DATED | : October 6, 2009 | |
| INVENTOR(S) | : Dan Dodge et al. | |

It is certified that error appears in the above-identified patent and that said Letters Patent is hereby corrected as shown below:

On the Title Page

Page 2, left column, line 4, under "U.S. PATENT DOCUMENTS", after "1/2005" replace "Lafuite et al." with --Papadopoulos et al.--.

Signed and Sealed this

Twelfth Day of January, 2010

David J. Kappos
*Director of the United States Patent and Trademark Office*

(12) EX PARTE REEXAMINATION CERTIFICATE (9057th)
United States Patent
Dodge et al.

(10) Number: US 7,599,972 C1
(45) Certificate Issued: Jun. 5, 2012

(54) FILE SYSTEM HAVING VARIABLE LOGICAL STORAGE BLOCK SIZE

(75) Inventors: Dan Dodge, Nepean (CA); Peter Van Der Veen, Ottawa (CA)

(73) Assignee: QNX Software Systems GmbH & Co. KG, Hannover (DE)

Reexamination Request:
No. 90/011,299, Oct. 26, 2010

Reexamination Certificate for:
Patent No.: 7,599,972
Issued: Oct. 6, 2009
Appl. No.: 11/510,174
Filed: Aug. 25, 2006

Certificate of Correction issued Jan. 12, 2010.

(51) Int. Cl.
*G06F 17/30* (2006.01)

(52) U.S. Cl. ............... 707/205; 707/999.202; 707/999.205; 711/114; 711/162; 711/170

(58) Field of Classification Search ............ 707/205
See application file for complete search history.

(56) References Cited

To view the complete listing of prior art documents cited during the proceeding for Reexamination Control Number 90/011,299, please refer to the USPTO's public Patent Application Information Retrieval (PAIR) system under the Display References tab.

*Primary Examiner* — Rachna Desai

(57) ABSTRACT

A system is set forth that includes a processor, a data storage device that accessible by the processor, and filesystem software that executable by the processor to organize files on the data storage device. The filesystem software is executable to organize files on the data storage device in storage areas having different logical storage block sizes that are dependent on file type. In one implementation, the filesystem software is executable to generate a hole map associated with the data storage device. The hole map comprises data indicative of a logical storage block size for each of a plurality of storage areas of the data storage and, optionally, data indicative of a degree of usage for each of the plurality of storage areas. The filesystem may identify the file type using a filename of the file and/or embedded file information.

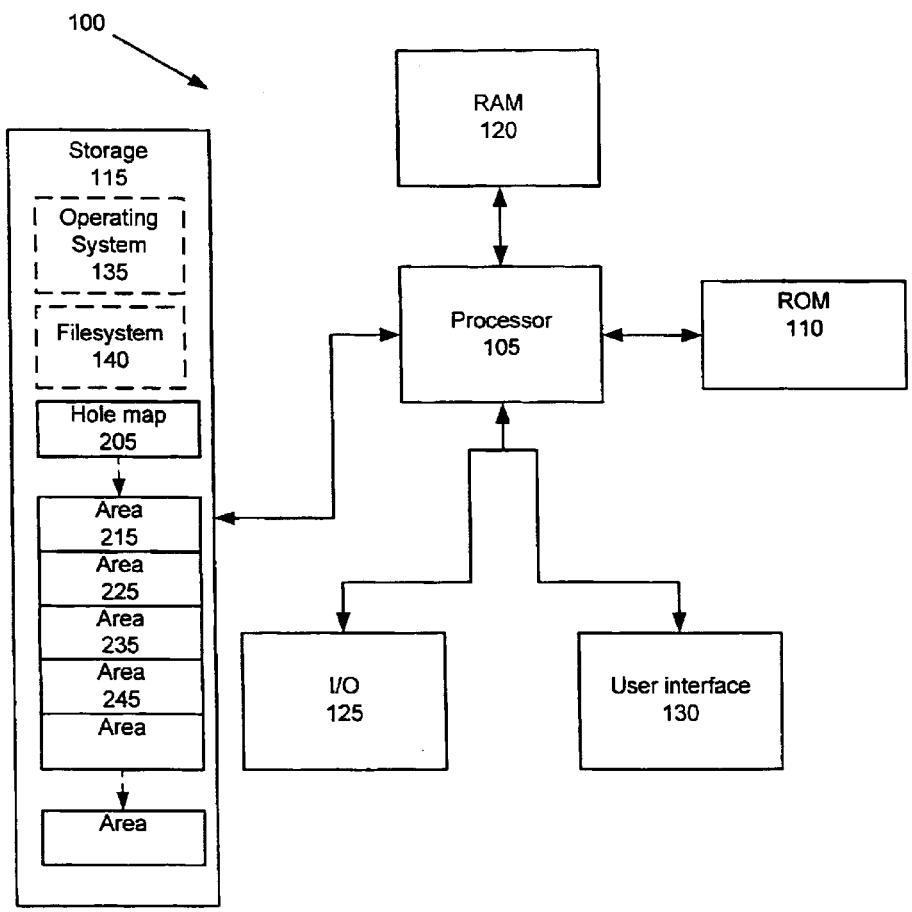

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 12 are determined to be patentable as amended.

Claims 2-11 and 13-19 dependent on an amended claim, are determined to be patentable.

New claim 20 is added and determined to be patentable.

1. A system comprising:

a processor;

a data storage device having memory accessible by the processor;

filesystem code executable by the processor to manage files of different file types on the data storage device using different storage area types *based on which of the different storage area types is assigned to the file type of each file*, where the different storage area types define different logical storage block sizes used by the filesystem to logically divide the memory of the data storage device, *where each of the different logical storage block sizes corresponds to a size of an in-memory cache associated with at least one physical block of the data storage device, and each of the different logical storage block sizes is a smallest unit of a data transferred between the in-memory cache and the at least one physical block of the data storage device,* where the filesystem code identifies the file type of each file managed by the filesystem code and executes memory transactions for each managed file using the storage area type assigned to the file type, *and where the file type of each file identifies a type of content in each file.*

12. A system comprising:

a processor;

a data storage device having memory storage accessible by the processor;

filesystem code executable by the processor to manage files on the data storage device, where the filesystem code is executable to manage files on the data storage device using storage areas of a first type having a first logical storage block size and storage areas of a second type having a second logical storage block size that differs in size from the first logical storage block size, where the first and second logical storage block sizes are used by the filesystem code to logically divide the memory of the storage device, [and] where the filesystem code is further executable to store [file data of] a file of a first file type in storage areas of the first type and [file data of] a file of a second file in storage areas of the second type *based on the first file type being assigned to the storage areas of the first type and the second file type being assigned to the storage areas of the second type, where each of the first and second logical storage block sizes corresponds to a size of an in-memory cache associated with at least one physical block of the data storage device, and each of the first and second logical storage block sizes is a smallest unit of data transferred between the in-memory cache and the at least one physical block of the data storage device,* [and] where the filesystem code is executable to identify whether each file managed by the file system code is of the first or second file type, *and where the file type of each file identifies a type of content in each file.*

20. *The system of claim 1, where the filesystem code stores a portion of a file having one file type in one of the different storage area types that is not assigned to the one file type in response to a failure to locate free space in one of the different storage area types that is assigned to the one type.*

\* \* \* \* \*